(12) United States Patent
Kisailus et al.

(10) Patent No.: US 11,623,211 B2
(45) Date of Patent: Apr. 11, 2023

(54) TEMPLATE-FREE TUNED LIGHT DRIVEN PHOTOCATALYST AND METHOD

(71) Applicant: The Regents of the University of California, Oakland, CA (US)

(72) Inventors: David Kisailus, Riverside, CA (US); Taifeng Wang, Riverside, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 263 days.

(21) Appl. No.: 16/855,824

(22) Filed: Apr. 22, 2020

(65) Prior Publication Data
US 2020/0338544 A1  Oct. 29, 2020

Related U.S. Application Data

(60) Provisional application No. 62/839,426, filed on Apr. 26, 2019.

(51) Int. Cl.
*B01J 37/08* (2006.01)
*B01J 35/00* (2006.01)
(Continued)

(52) U.S. Cl.
CPC .............. *B01J 37/08* (2013.01); *B01J 27/24* (2013.01); *B01J 35/004* (2013.01); *B01J 35/023* (2013.01);
(Continued)

(58) Field of Classification Search
CPC ........ B01J 23/20; B01J 2523/57; B01J 37/08; B01J 27/24; B01J 35/004; B01J 35/023; B01J 35/08; B01J 37/04; B01J 35/1004
(Continued)

(56) References Cited

U.S. PATENT DOCUMENTS 5,015,461 A * 5/1991 Jacobson ............. C01G 41/006
                                                    502/340
5,112,676 A * 5/1992 Cot .................... C23C 18/1216
                                                    427/126.6
(Continued)

FOREIGN PATENT DOCUMENTS

JP    2006-263504    * 10/2006 .............. B01J 23/20

OTHER PUBLICATIONS

Qinghong Zhang and Lian Gao, "Ta3N5 Nanoparticles with Enhanced Photocatalytic Efficiency under Visible Light Irradiation." Langmuir, vol. 20, No. 22, pp. 9821-9827. (Year: 2004).*

*Primary Examiner* — Patricia L. Hailey
(74) *Attorney, Agent, or Firm* — Schwegman Lundberg & Woessner, P.A.

(57) ABSTRACT

Described herein are methods of making the visible light photocatalysts without the use of templates that can comprise: (1) mixing a metal precursor, an alcohol, and a solvent to form a self assembled shapes at a temperature between the freezing point of the solvent and the boiling point of the solvent, (2) strengthening the shapes at a temperature of about 35° C. to about 300° C. for about 30 minutes to about 96 hours, and then (3) annealing the shapes at a temperature of between about 450° C. to about 750° C. for between about 4 hours to about 16 hours in a gaseous atmosphere. Also described are photocatalysts created by the described methods.

11 Claims, 9 Drawing Sheets

(51) Int. Cl.
  *B01J 37/04* (2006.01)
  *B01J 27/24* (2006.01)
  *B01J 35/02* (2006.01)
  *B01J 35/08* (2006.01)
  *B01J 35/10* (2006.01)

(52) U.S. Cl.
  CPC ............... *B01J 35/08* (2013.01); *B01J 37/04* (2013.01); *B01J 35/1004* (2013.01)

(58) Field of Classification Search
  USPC .................... 502/200, 353; 977/811, 883
  See application file for complete search history.

(56) References Cited

U.S. PATENT DOCUMENTS

| | | | | |
|---|---|---|---|---|
| 5,958,363 | A * | 9/1999 | Coronado | ............... C01B 13/32 423/608 |
| 8,790,754 | B1 * | 7/2014 | Rangan | ............... C01B 21/0617 427/419.7 |
| 2008/0085230 | A1 * | 4/2008 | Evstratov | ............... B01J 21/063 502/355 |
| 2009/0202714 | A1 * | 8/2009 | Mandzy | ................. B82Y 30/00 427/164 |
| 2011/0143929 | A1 * | 6/2011 | Sato | ....................... B01J 35/004 502/200 |
| 2012/0093703 | A1 * | 4/2012 | Lewis | ..................... B01J 35/10 502/343 |
| 2016/0121319 | A1 * | 5/2016 | Tokudome | ........... C01G 23/003 502/328 |
| 2017/0326531 | A1 * | 11/2017 | Tokudome | ............. B01J 21/066 |
| 2018/0044199 | A1 * | 2/2018 | Driessche | .............. C01G 35/00 |

\* cited by examiner

TEMPLATE-FREE TUNED LIGHT DRIVEN PHOTOCATALYST AND METHOD

CLAIM OF PRIORITY

This application claims the benefit of priority under 35 U.S.C. § 119(e) to U.S. Provisional Patent Application Ser. No. 62/839,426, filed on Apr. 26, 2019, which is incorporated by reference herein in its entirety.

STATEMENT OF GOVERNMENT INTEREST

This invention was made government support under Contract Nos. FA9550-15-1-0009 awarded by the Air Force Office of Scientific Research, W911NF-16-1-0208 awarded by the Army Research Office, and under Contract No. DMR 0958796 awarded by the National Science Foundation. The Government has certain rights in the invention.

BACKGROUND

The embodiments are related to template-free methods of making tunable light activated photocatalysts and the associated photocatalysts for use in water purification, water splitting for hydrogen production, disinfection, and other similar fields.

Field

The embodiments are related to template-free methods of making tunable light activated photocatalysts and the associated photocatalysts for use in water purification, water splitting for hydrogen production, disinfection, and other similar fields.

Description of the Related Art

The rapid increase of technology and industry is causing new production chemicals and byproducts to be discharged into the wastewater system. These contaminants are now being found in ground and surface water, causing increased concern for the future supply of drinking water. The occurrences of emerging contaminants, which are just now being detected, with the advancement in measurement technologies, are causing increased concern for public health and safety. In order to protect the population and the environment new treatment technologies need to be developed that will not only remove these compounds but degrade them to non-harmful constituents.

Environmental problems associated with harmful pollutants discharged into our water systems are, in part, generated from rapid growing technologies and industries, posing severe threats to human health.

Although many water purification technologies currently exist (i.e., powder activated carbon, chlorination, polymer membranes, etc.), they each have drawbacks including the inability to remove all classes of organics or potential hazardous byproducts. Conversely, photocatalysis provides an energy-efficient and green pathway to completely degrade organic pollutants in water using light activation. However, many current photocatalysts, such as $TiO_2$, which are stable against photo corrosion have large bandgaps, and thus, can only utilize photons efficiently in the ultraviolet region, which occupies no more than 4% of the entire solar spectrum. Therefore, finding effective visible-light driven photocatalysts should enable a more significant fraction of the solar spectrum to be captured and lead to increased photodegradative efficiencies.

Although other water purification technologies exist such as, powder activated carbon, chlorination, ozonation, polymer membranes, they each have drawbacks including the inability to remove all classes of organics, nitrates, and other impurities. Powder Activated Carbon is known to adsorb the organic compounds but does not degrade them. Chlorination is a common oxidant used but produces chlorinated byproducts that may be more dangerous than the original contaminant. Chlorination is also not as effective towards certain bacteria such as *Helicobacter pylori* and does not address *cyptosporidium* and *giardia* contamination. Polymer-based membranes are not as effective and are potentially susceptible to biofouling and scale. Thus, the polymer membranes need to be periodically cleaned with bleach or acids, which can reduce their lifetime to 1 year or less and leads to significant downtimes.

Photocatalysis provides an efficient path to oxidize organic compounds using light activation to produce electrons and holes, which react with water or oxygen to form radicals that aggressively oxidize organics. Many photocatalytic materials exist, the most common is titanium dioxide. Although $TiO_2$ is a good photocatalyst, it requires UV activation, which represents ~5% of the solar spectrum and is therefore not as effective when sunlight is used as the illumination source. In addition, many $TiO_2$ micro and nanoparticles used in photocatalysts have a lower surface area, limiting the efficiency of radical formation.

In addition, world energy needs are placing higher demands on the development of inexpensive and efficient conversion technologies. Solar hydrogen production and photovoltaic applications offer potentially affordable and renewable routes to energy production.

Currently most of the hydrogen created in the United States is made via steam methane reforming. Which uses high temperature and pressure steam to crack a methane source, usually a fossil fuel, such as natural gas, to create hydrogen and carbon monoxide. Then a water gas is used to turn the carbon monoxide into carbon dioxide. The carbon dioxide is then removed as an impurity.

Although, hydrogen generation can be done cleanly from electrolysis of water directly, the process without a catalyst requires a substantial amount of energy.

To date, several visible-light-driven photocatalysts, such as $In_{1-x}Ni_xTaO_4$, $Sm_2Ti_2O_5S_2$, $Ag_3PO_4$, and solid-solution fabrication as in $(Ga_{1-x}Zn_x)(N_{1-x}O_x)$ and ZnS—$CuInS_2$—$AgInS_2$, have been investigated. Among these semiconductor photocatalysts, $Ta_3N_5$, which has a narrow bandgap of 2.1 eV, utilizes a large fraction of visible light up to 600 nm, has drawn significant interest.

In addition to their intrinsic properties, the structural features of photocatalytic particles play an important role in improving the performance by increasing the surface area of the material and impeding the recombination of photoexcited hole-electron pairs. In order to enhance the photocatalytic activity, efforts have been made to control the synthesis of $Ta_3N_5$ nanoparticles with well-defined sizes and structures. These include $Ta_3N_5$ nanotube arrays, nanorods, nonwoven cloth, and microspheres. Among these, hollow nanospheres have attracted increasing interest among researchers due to their low density, large surface area and wide range of potential applications. A few studies have successfully synthesized $Ta_3N_5$ hollow spheres, which showed very promising photocatalytic performance. For example, synthesized monodispersed $Ta_3N_5$ hollow spheres are formed using polystyrene-coacrylamide) (PSAM) colloidal spheres as hard templates. However, the preparation processes for these methods can require significant amounts of energy and time due to the complex synthetic procedures as well as high-temperature calcinations to remove the core templates, which may reduce surface area and thus efficiency.

As a result, there is a need to new materials which can be used to efficiently remove contaminants from water as well as a need for efficient and more environmentally friendly means of generating hydrogen.

DETAILED DESCRIPTION OF THE INVENTION

Figure 1:
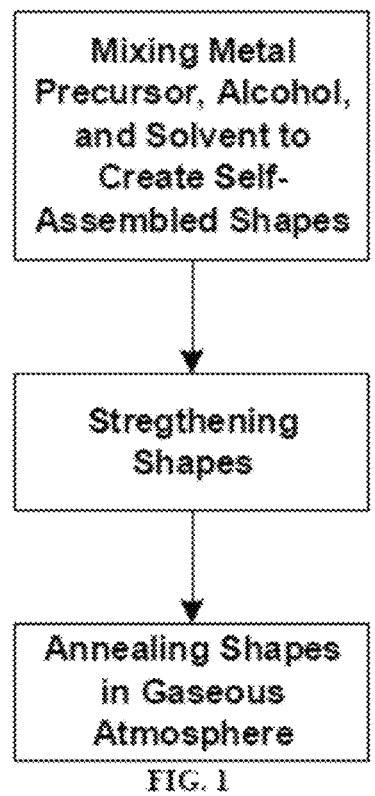
FIG. 1 is a non-limiting embodiment of a method for developing the tantalum nitride, tantalum oxide and tantalum oxy-nitride catalyst without a template.

Some embodiments describe a process that can be used to synthesize photocatalysts without the use of templates. Some methods describe a method to synthesize a visible-light activated, high surface area photocatalyst, tantalum nitride hollow micro-(HMS) or nano-spheres (HNS). Tantalum oxide HNS can be formed via an orchestrated solution-based synthesis and subsequently converted to tantalum nitride FINS via controlled ammonolysis. Evolution of structure, composition and phase is evaluated. In addition, the as-synthesized tantalum nitride ($Ta_3N_5$) nanostructures are utilized to photo-catalytically degrade methylene blue (MB) dyes in aqueous solution under visible light illumination. The photocatalytic efficiency is evaluated as a function of nitrogen content, which is controlled via annealing. Thus, the solution-based fabrication process is not only simple but is also viable for mass production of $Ta_3N_5$HNS, but also the as-prepared products show significantly enhanced photocatalytic performance for MB dye degradation under visible light over other $Ta_3N_5$ nanostructures.

Some embodiments can describe a method of making a tuned, light-activated photocatalyst without the use of templates. Some methods can comprise: (1) mixing a metal precursor, an alcohol, and a solvent to form self-assembled shapes at a temperature between the freezing point of the solvent and the boiling point of the solvent, (2) strengthening the shapes at a temperature of about 35° C. to about 300° C. for about 30 minutes to about 96 hours, and then (3) annealing the shapes at a temperature of between about 450° C. to about 750° C. for between about 4 hours to about 16 hours in a gaseous atmosphere. In some methods, the step of mixing a metal precursor can comprise mixing a metal salt, a metal alkoxide, a metal halide, or a combination thereof. In some embodiments, the step of mixing a metal precursor can comprise mixing a metal alkoxide. For some methods, the step of mixing a metal alkoxide can comprise mixing tantalum alkoxide. With some embodiments, the step of mixing an alcohol can comprise mixing in methanol, ethanol, n-propanol, isopropanol, n-butanol, sec-butanol, isobutanol, or tert-butanol.

In some embodiments, the step of mixing an alcohol can comprise mixing in ethanol. For some methods, the step of mixing a solvent may comprise mixing in water. In some methods, the volume ratio of ethanol to water is from about 1:2 to about 1:40. For some embodiments, the volume ratio of ethanol to water is 2:5. Some methods can have the volume ratio of ethanol to water as 1:20. In some embodiments, the step of strengthening the shapes can be done at a temperature of 200° C. from 12 hours to 72 hours. For some methods, the step of strengthening the shapes is done at a temperature of 200° C. from 12 hours to 48 hours. With some embodiments, the step of annealing the shapes can be done at 625° C. for 8 hours. In some method embodiments, the step of annealing the shapes can be done in a nitriding atmosphere. Some methods can have the step of annealing the shapes done in an ammonia atmosphere.

Some methods for making visible light photocatalyst without the use of templates can comprise: (1) mixing ethanol, water, and a tantalum ethoxide to form self-assembled, hollow spheres of tantalum oxide, (2) strengthening at a temperature of about 100° C. to about 300° C. for about 6 hours to about 96 hours to mechanically stiffen the spheres, and then (3) annealing the tantalum oxide to $Ta_3N_5$ at a temperature of between about 450° C. to about 750° C. for between about 4 hours to about 16 hours in an ammonia atmosphere.

In one example the shapes, such as hollow spheres, can be further interconnected. Providing interconnectivity of the nanoparticle networks in the shells of hollow shapes/spheres can also be enabled using localized dissolution and reprecipitation. This can occur at room temperature (above the freezing point of the solvent) with solvents that can dissolve the inorganic component. This can be done with acids or bases in extreme ranges—such that the solubility of the inorganic is enhanced.

In one example, annealing is performed at a temperature lower than 450° C. In selected examples, metal nitride particles are formed during annealing as long as there is a nucleophilic nitrogen containing molecule (for example, ammonia) such as a primary or secondary amine, that can displace oxygen in the metal precursor, yielding the nitride phase. In selected examples, the annealing is performed above the solution temperature (freezing point), and may be performed below 450° C.

In selected examples, conversion from oxide to nitride can happen in seconds. Factors that may affect conversion time include the temperature and thickness of the shell and nanoparticle diameter.

In selected examples, molecular precursors can also be any metal-ligand complex that is soluble in the solvent. Precursors may include, but are not limited to, metal sulfates, nitrates, and hydroxides can be used.

In selected examples, other solvents can be used apart from alcohols. As long as the precursor is soluble in a solvent that may phase separate from water. Thus, for example, tantalum-alkanes in alkane-based solvents can be used. The water will provide the phase separation and the nucleophilicity to bind to the metal and form the oxide. Then the oxide can be converted to the nitride.

In selected examples, annealing in environments apart from ammonia are included in the scope of the invention. Modifications can include other nitrogen containing nucleophilic complexes. In one example the solution pH can be modified to tune solubility. Other methods to increase solubility such as modifying pressure are also within the scope of the invention.

Although the term "atmosphere" is used in examples above, the invention is not limited to gas phase examples. In selected examples, nitridation can be performed in solution at liquid phase.

The solution based, scalable processes described herein can enable formation of tunable sized, high surface area hollow nano- or micro-spheres that consist of oriented nanoparticles on the periphery of the sphere. The bandgap of the resulting material can range from 1.2 eV to about 4.5 eV. Some catalysts can have a band gap of about 2.1 eV, enabling a significantly larger fraction of the solar spectrum to be absorbed (~30%). The hollow nature of these spheres enables fast kinetics for organic pollutants to reach the inside and outside of the sphere. In addition, the hollow nature allows for light to scatter within the sphere, increasing the probability for an absorption event, which means more radicals formed and faster degradation of organics. These photocatalysts can be used for the destruction (e.g. via oxidation) of impurities in water, hydrogen generation in water, or the reduction of microbes on surfaces. These and other embodiments are described in greater detail below.

Some embodiments describe a process to synthesize a visibly activated, high surface area photocatalysts. In some methods, the catalysts made can define hollow nano-(HNS) or microspheres (HMS). In some methods, the catalysts made can define nanorods. While not wanting to be limited by theory, it is thought that this solution based, scalable process enables the formation of tunable sized, high surface area hollow nano- or micro-spheres with porosity that can be used to control scattering of light within, rate of diffusion of species within or external to these spherical reactors. Some methods can comprise include making different compositions catalysts of metal nitride, metal carbide, metal sulfide, metal phosphate, and the like. Based on the solution state of the precursors, these materials can also be doped with other cations or anions. Furthermore, the samples can be heated in such a way that the crystallinity of the primary particles (basic nanocrystalline building blocks) can be tuned, which affects the mechanical and chemical stability as well as the rate of catalytic activity. In addition, the use of carbon in the precursors can add an additional advantage of incorporating disordered or crystalline carbon (graphene) into the spheres, which will aid in avoiding electron-hole recombination, which can therefore improve the lifetime of radical species.

The controlled size of these nano- or micron-sized spheres can also lead to formation of either highly ordered, self-assembled thin films or packed bed reactors with potential of having >90% sphere packing. The resulting porosity between these secondary particles (the hollow spheres themselves) will enable tuning of pressure drops across membrane-based structures, which will save on capital costs.

In some embodiments, the photocatalyst can be part of a larger 3-D organized system, such as a 3-D printed system. While not wanting to be limited by theory it is thought that using solution-based precursors where large quantities can be synthesized lends to the ability of the catalyst spheres being organized into larger hierarchically derived structures.

Template-Free Method of Making a Catalyst

Some embodiments describe a method of making the tuned, light-activated photocatalyst without the use of templates that can comprise: (1) mixing a metal precursor, an alcohol, and a solvent to form a self-assembled shapes at a temperature between the freezing point of the solvent and the boiling point of the solvent, (2) strengthening the shapes at a temperature of about 35° C. to about 300° C. for about 30 minutes to about 96 hours, and then (3) annealing the shapes at a temperature of between about 450° C. to about 750° C. for between about 4 hours to about 16 hours in a gaseous atmosphere. The result can be a catalyst.

In some embodiments, the resulting catalysts can have a bad gap within the range of about 1.2 eV to about 4.5 eV, about 1.5 eV to about 4.0 eV, or about 2.1 eV to about 4.0 eV, or any combination thereof. In some methods, the catalyst produced can have a band gap of the range of about 2.1 eV, or a catalyst that can be activated by visible light, or other equivalent energy source.

Some embodiments describe a method of making the visible light photocatalyst without the use of templates that can comprise: (1) mixing ethanol, water, and a tantalum ethoxide to form self-assembled, hollow spheres of tantalum oxide, (2) strengthening at a temperature of about 100° C. to about 300° C. for about 6 hours to about 96 hours to mechanically stiffen the spheres, and then (3) annealing the tantalum oxide to $Ta_3N_5$ at a temperature of between about 450° C. to about 750° C. for between about 4 hours to about 16 hours in an ammonia atmosphere.

At intermediate annealing temperatures and shorter annealing times, the concentration of nitrogen in the catalyst can be tuned to vary the band gap (via production of tantalum oxy-nitrides). In some embodiments, the catalyst produced can define hollow spheres. In some embodiments, the hollow spheres can be nanospheres where the diameter is 1000 nm or less. In some methods, the hollow spheres can be microsphere where the diameter 100 μm or less. In some embodiments, the catalyst produced can define nanorods. A non-limiting embodiment of such a method is depicted in FIG. 1.

Mixing

In some methods, the step of mixing a metal precursor can comprise mixing a metal salt, a metal alkoxide, a metal halide, or a combination thereof. In some embodiments, the step of mixing a metal precursor can comprise mixing a metal alkoxide. In some embodiments, the step of mixing a metal alkoxide can comprise mixing tantalum alkoxide. In some embodiments, the tantalum alkoxide can comprise tantalum methoxide, tantalum ethoxide, tantalum propoxide, tantalum butoxide, or any combination thereof. In some steps, the step of mixing tantalum alkoxide can comprise mixing tantalum ethoxide.

In some embodiments, the step of mixing an alcohol can comprise mixing methanol, ethanol, n-propanol, isopropanol, n-butanol, sec-butanol, iso-butanol, or tert-butanol. In some embodiments, the step of mixing alcohol can comprise mixing ethanol.

Figure 2:
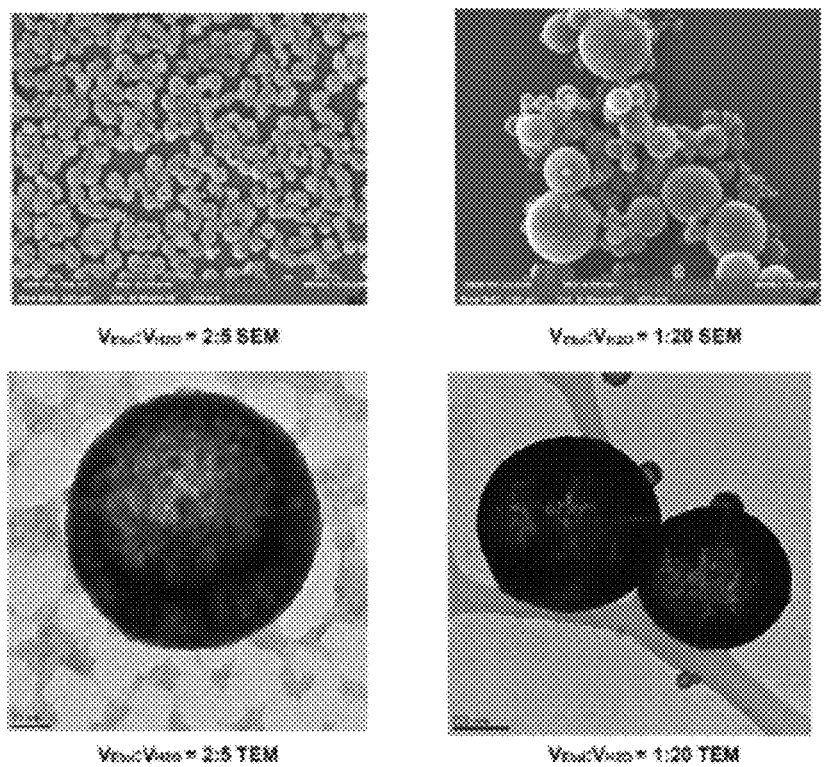
FIG. 2 are Scanning Electron Microscope images of various hollow spheres whose diameters vary depending on the ratio of ethanol to water.
Figure 3:
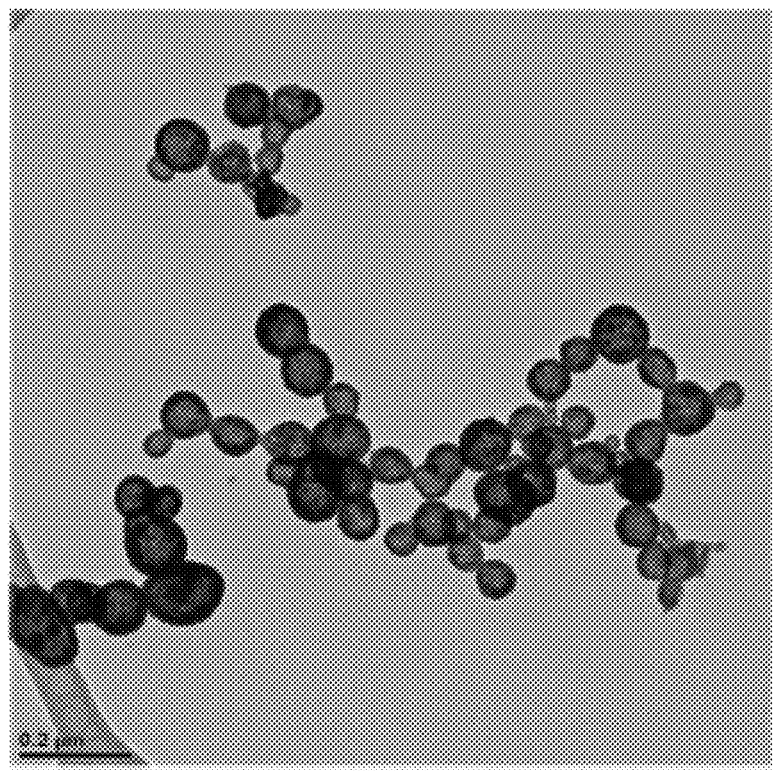
FIG. 3 is one embodiment of the hollow spheres.
Figure 4:
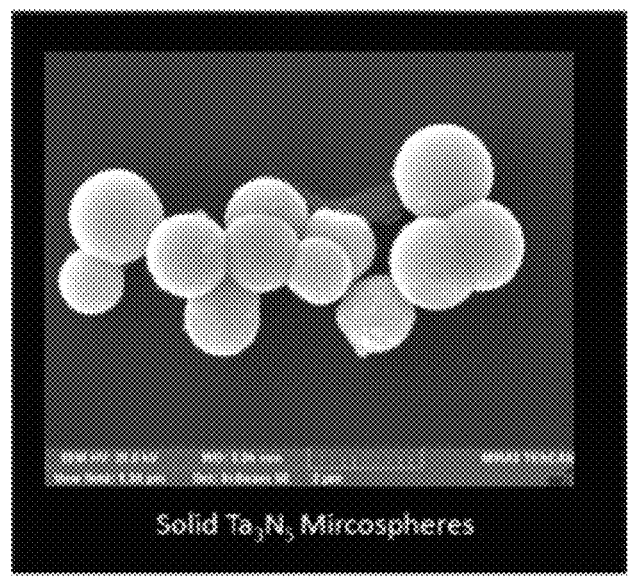
FIG. 4 is one example showing solid spheres, which are distinguishable from the hollow spheres.

In some methods, the step of mixing a solvent can comprise mixing in a solvent that creates a solvent, alcohol system that facilitates with any variation of hydrophilic and/or hydrophobic system that provides for micelle development and thus hollow sphere formation. In some methods, the step of mixing in a solvent can comprise mixing in additional alcohol. In some methods, the step of mixing in a solvent can comprise mixing in water. In some embodiments, no water is used. In some embodiments, the volume ratio of alcohol to water can range from about 1:2, about 2:5, about 1:3, about 1:10, about 1:15, about 1:20, about 1:30, to about 1:40, or any combination thereof, such as about 2:5, or about 1:20. Different sizes of particles are shown for various water ratios in FIG. 2. When water is used, hollow spheres result, as shown in FIG. 3. The hollow spheres can be distinguished from solid spheres, made when no water is used as shown in FIG. 4.

In some embodiments, the step of mixing can be accomplished by sonicating for about 3 minutes to about 10 minutes, or about 5 minutes. In some embodiments, the step of stirring can be done by stirring at about 450 rpm to about 750 rpm, or about 600 rpm.

In some methods, the step of mixing can be done at a temperature of between about 0° C. to about 100° C. In some methods, the step of mixing can be done at a temperature of about 20° C., or room temperature. While not wanting to be limited by theory, it is thought that the use of hydrothermal annealing is not necessary to shape formation as it is thought that the shapes form at the mixing step.

Strengthening the Self-Assembled Shapes

Figure 5:
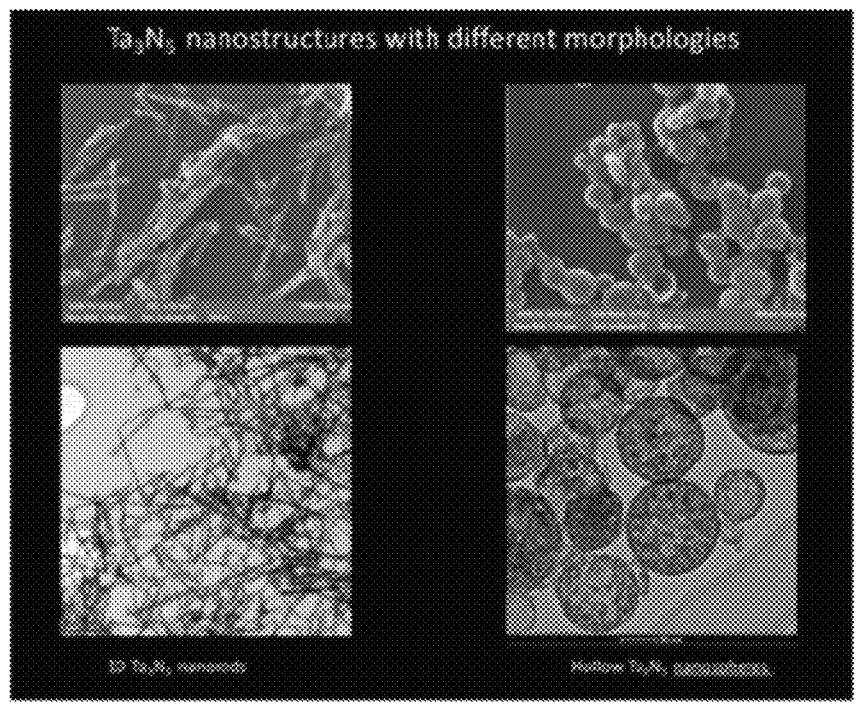
FIG. 5 is a collection of images showing the different morphologies that can result from manipulating the synthesizing parameters.

For some method embodiments, the step of strengthening the self-assembled shapes can be done at a temperature of about 35° C., about 50° C., about 100° C., about 200° C., about 300° C., about 400° C., 500° C., to about 600° C., or any combination thereof, for about 30 minutes, about 1 hour, about 2 hours, about 3 hours, about 4 hours, about 5 hours, about 6 hours, about 12 hours, about 24 hours, about 48 hours, about 72 hours, to about 96 hours, or any combination thereof. In some embodiments, the step of strengthening can be done at a temperature of about 100° C. to about 300° C. for about 6 hours to about 96 hours. With some embodiments, the step of strengthening can be done at a temperature of about 200° C. for about 12 hours to about 48 hours. For some embodiments, the step of strengthening can be done at a temperature of about 200° C. for about 12 hours. In some embodiments, the step of strengthening can be done at a temperature of about 200° C. for about 48 hours. While not wanting to be limiting by theory it is thought that heating to remove solvent will mechanically stiffen the shapes. While not wanting to be limited by theory it is thought that the duration of strengthening can be manipulated to change the morphology of the particles, for example about 12 hours can result in hollow micro- or nanospheres, and 48 hours can result in $Ta_2O_5$ nanorods. Different morphologies are depicted in FIG. 5. In one example, hollow shapes/spheres are interconnected, or crosslinked, at tangent points to provide a stiffer morphology.

Rising and Drying

For some methods, the method can further comprise the steps of rinsing and drying the amorphous tantalum oxide hollow spheres after strengthening. The step of rinsing can comprise centrifuging the resulting solution, rinsing, centrifuging again, and then drying. The solution can be centrifuged at about 10,000 rpm to about 15,000 rpm, or about 13,000 rpm, for about 10 min to about 30 min, or about 15 min. Rising can comprise rinsing with water, such as DI water. Some embodiments, the step of rinsing with water can comprise rinsing twice with water. Rinsing can further comprise rinsing with ethanol. Drying can comprise drying the composition in an oven at about 40° C. to about 100° C., or about 60° C., for about 8 hours to about 16 hours, or about 12 hours, or about 15 hours.

Annealing

For some methods, the step of annealing in a gaseous atmosphere can comprise annealing in a nitriding atmosphere, hydrogen gas, $H_2/N_2$ gas, hydrogen sulfide gas, phosphine gas, or a combination thereof. In some methods, the nitriding atmosphere can be $NH_3$, $NH_4$, $H_2/N_2$, amines, imines, and the like. In some methods, the nitriding atmosphere can comprise ammonia. In some embodiments, the step of annealing can be done at a temperature of between about 450° C., about 500° C., about 550° C., about 625° C., about 700° C. to about 750° C., or any combination thereof, such as about 625° C. In some embodiments, the step of annealing can be done for a duration of between about 4 hours, about 6 hours, about 8 hours, about 12 hours, to about 16 hours, or any combination thereof, such as about 4 hours, about 8 hours, or about 12 hours.

In addition, nitrogen containing solvents such as long chain primary amines can be used as nucleophilic reagents that will displace oxygen under solution conditions. These solution conditions can be under ambient conditions. IN one example, solvothermal conditions are utilized (i.e., in a pressurized vessel containing nitrogen based solvent, under high pressure).

In some methods, where the step of mixing an alcohol, a solvent, and a metal precursor to form a self-assembled shapes comprises mixing alcohol, water, and a tantalum ethoxide to form self-assembled tantalum oxide, annealing in a nitriding atmosphere, such as ammonia, can be done to convert the tantalum oxide to $Ta_3N_5$.

EMBODIMENTS

The following embodiments are specifically contemplated by this disclosure:

Embodiment 1. A method of making a tuned, light-activated photocatalyst without the use of templates comprising: (1) mixing a metal precursor, an alcohol, and a solvent to form a self assembled shapes at a temperature between the freezing point of the solvent and the boiling point of the solvent, (2) strengthening the shapes at a temperature of about 35° C. to about 300° C. for about 30 minutes to about 96 hours, and then (3) annealing the shapes at a temperature of between about 450° C. to about 750° C. for between about 4 hours to about 16 hours in a gaseous atmosphere.

Embodiment 2. The method of Embodiment 1, where step of mixing a metal precursor comprises mixing a metal salt, a metal alkoxide, a metal halide, or a combination thereof.

Embodiment 3. The method of Embodiment 1 or 2, where the step of mixing a metal precursor comprises mixing a metal alkoxide.

Embodiment 4. The method of Embodiment 1, 2, or 3, where the step of mixing a metal alkoxide comprises mixing tantalum alkoxide.

Embodiment 5. The method of Embodiment 1, 2, 3, or 4, where the step of mixing an alcohol comprises mixing in methanol, ethanol, n-propanol, isopropanol, n-butanol, sec-butanol, iso-butanol, or tert-butanol.

Embodiment 6. The method of Embodiment 1, 2, 3, 4, or 5, where the step of mixing an alcohol comprises mixing in ethanol.

Embodiment 7. The method of Embodiment 1, 2, 3, 4, or 6, where the step of mixing a solvent comprises mixing m water.

Embodiment 8. The method of Embodiment 7, where the volume ratio of ethanol to water is from about 1:2 to about 1:40.

Embodiment 9. The method of Embodiment 7 or 8, where the volume ratio of ethanol to water is 2:5.

Embodiment 10. The method of Embodiment 7, 8, or 9, where the volume ratio of ethanol to water is 1:20.

Embodiment 11. The method of Embodiment 1, 2, 3, 4, 5, 6, 7, 8, 9, or 10, where the step of strengthening the shapes is done at a temperature of 200° C. from 12 hours to 72 hours.

Embodiment 12. The method of Embodiment 11, where the step of strengthening the shapes is done at a temperature of 200° C. from 12 hours to 48 hours.

Embodiment 13. The method of Embodiment 1, 2, 3, 4, 5, 6, 7, 8, 9, 10, 11, or 12, where the step of annealing the shapes is done at 625° C. for 8 hours.

Embodiment 14. The method of Embodiment 1, 2, 3, 4, 5, 6, 7, 8, 9, 10, 11, 12, or 13, where the step of annealing the shapes is done in a nitriding atmosphere.

Embodiment 15. The method of Embodiment 1, 2, 3, 4, 5, 6, 7, 8, 9, 10, 11, 12, 13, or 14, where the step of annealing the shapes is done in an ammonia atmosphere.

Embodiment 16. A method of making the visible light photocatalyst without the use of templates that can comprise: (1) mixing ethanol, water, and a tantalum ethoxide to form self assembled, hollow spheres of tantalum oxide, (2) strengthening at a temperature of about 100° C. to about 300° C. for about 6 hours to about 96 hours to mechanically stiffen the spheres, and then (3) annealing the tantalum oxide to $Ta_3N_5$ at a temperature of between about 450° C. to about 750° C. for between about 4 hours to about 16 hours in an ammonia atmosphere.

EXAMPLES

It has been discovered that embodiments of the method for making a photocatalyst without a template is useful in creating visible light photocatalysts. Such synthesized photocatalysts, such as $Ta_3N_5$ hollow sphere powder, can be used as photocatalyst for photodegradation of dye or water splitting directly. In addition, it can be used as a visible light activated catalyst for additional applications, such as disinfection. It can also be potentially applied into other photocatalytic systems. These benefits are further shown by the following examples, which are intended to be illustrative of the embodiments of the disclosure, but are not intended to limit the scope or underlying principles in any way.

Using the methods herein, $Ta_3N_5$ hollow nanospheres were synthesized as photocatalysts for water purification via a template-free solution route to form tantalum oxide HNS, which were subsequently thermally nitrided. The potential formation mechanism and structural evolution of the hollow nanospheres are discussed. The as-obtained $Ta_3N_5$HNS presents a superior photocatalytic performance for methylene blue dye (and potentially other organic pollutants) degradation under visible light irradiation compared with other $Ta_3N_5$ nanostructures.

The high photocatalytic efficiency is attributed to the unique mesoporous structure, high specific surface area, high crystallinity with few oxygen defects and a potential for multiple light interactions within the hollow spheres. Clearly, the presence of amorphous regions and residual oxygen content in the nitride product are key limiting factors in the photocatalytic performance of these HNS. It was observed that increasing the annealing temperature or extending thermal treatment duration will lead to the collapse of the FINS structures.

The reagents were of analytical grade and used without purification. Tantalum(V) ethoxide [$Ta(OCH_2CH_3)5$, 99.98%] was purchased from Sigma Aldrich. Ethanol [$C_2H_5OH$] was purchased from Wako. Ammonia gas was supplied by Airgas, Inc. Milli-Q water was used in all experiments.

Example 1.1

Creation of the Tantalum Oxide Nanospheres

Tantalum oxide hollow nanospheres were prepared via the following general hydrothermal method. First, 4 mL pure ethanol (Wako) and 130 μL tantalum (V) ethoxide (0.50 mmol; 99.9%, Sigma Aldrich) were mixed in a scintillation vial with sonication for 5 min. Then, the solution was added to 10 mL DI water (MilliQ) in a beaker with vigorous magnetic stirring at about 600 rpm, immediately forming a white slurry suspension. The resulting, mixture was then stirred for an additional 5 minutes.

The suspension was then transferred into a Teflon-lined cylindrical steel autoclave (23 mL, Parr Instruments, Inc.). The autoclave was sealed and heated at 200° C. for 12 hours in a convection oven and subsequently cooled to room temperature.

After the hydrothermal reaction, the autoclave was allowed to cool to room temperature. The resulting white precipitates were centrifuged, washed two to three times with deionized water (MilliQ). Optionally the, precipitates can be washed with ethanol (Wako) after washing with water. Washing included placing the cloudy solution in centrifuge tubes and then centrifuging at 13,000 rpm for 15 min, to result in a pellet. If rinsed again, the pellet was then sonicated with rinse. After rinsing, the white precipitates were then dried in a vacuum oven at 60° C. for 12 hours. After drying, the solid product was collected and the ground to powder, the result is Tantalum Oxide Hollow Spheres (TOHS).

Example 1.2

Synthesis of $Ta_3N_5$ Hollow Nanospheres

Tantalum nitride hollow nanospheres were prepared via thermal ammonolysis. The TORS powder was heated to 650° C. at 5° C./min in a tube furnace and held for 4 hours under a constant flow of anhydrous ammonia gas (150 mL/min) followed by cooling to room temperature naturally under a maintained ammonia gas flow. The result was a spherical photocatalyst, Hollow Spherical Photocatalyst 1 (HSPC-1).

Example 1.3

Additional Embodiments of $Ta_3N_5$ Hollow Nanospheres

Additional embodiments of TOHS powder were created using the method of Example 1.2 with the exception that the parameters of the method were varied by the parameters in Table 1.

TABLE 1

List of Hollow Spherical Catalyst Embodiments

| Embodiment | Ethanol:Water Ratio | Nitridation Parameters | Ammonia Flow Rate |
|---|---|---|---|
| HSPC-1 | 2:5 | 650° C. for 4 hours | 150 mL/min |
| HSPC-2 | 2:5 | 650° C. for 8 hours | 150 mL/min |
| HSPC-3 | 2:5 | 650° C. for 12 hours | 150 mL/min |
| HSPC-3 | 2:5 | 650° C. for 8 hours | 100 mL/min |
| HSPC-5 | 1:20 | 650° C. for 12 hours | 150 mL/min |

Example 3

Synthesis of Tantalum Oxide Nanorods

For the synthesis of Tantalum Oxide Nanorods, the synthetic method is the same as the method in Example 1, with the exception 10 mL of ammonia hydroxide (Sigma Aldrich) solution to adjust to a final pH of 9 and the solutions were hydrothennally treated as described above at 200° C., but for 48 hours instead of 12 hours. The result was tantalum oxide nanorods (TONR).

Example 4

Synthesis of $Ta_3N_5$ Nanorods

The tantalum nitride nanorods were prepared via thermal ammonolysis in the same manner as Example 2 with the exception that TONR was used for the starting material and it was exposed to a higher nitridation temperature of 800 for 12 hours. The result was photocatalyst nanorods, NRPC-1.

Comparative Example 1

Synthesis of $Ta_3N_5$ from Commercial Bulk Tantalum Oxide

Solid tantalum nitride (C—$Ta_3N_5$) was prepared via thermal ammonolysis from bulk commercial tantalum oxide (Sigma Aldrich) in the same manner as Example 2 with the exception that it was exposed to a higher nitridation temperature of 800° C. for 12 hours. The result was solid tantalum nitride catalysts, CPC-1.

Comparative Example 2

Formation of Tantalum Oxide Precursor without Hydrothermal Treatment

Tantalum oxide precursor was formed using the method in Example 1 with the exception that no DI water was added before heating in an autoclave. The result was a tantalum oxide precursor (TOPC).

Example 2.1

Characterization Background

Crystal structure (phase and size) analyses of obtained products were determined by powder X-ray diffraction (XRD, PANalytical Empyrean Series 2) using Cu Kα ($\lambda$=0.1546 nm). Particle sizes and morphologies were characterized using scanning electron microscopy (SEM) on a MIRA3 GMU SEM (Tescan). Validation of particle size, morphology, crystallinity, as well as grain evolution was conducted via bright field imaging and selected area electron diffraction (SAED) using transmission electron microscopy (TEM, FEI Tecnai T-12) at 120 kV. The adsorption band-edges of tantalum oxide and nitrides were determined via optical diffuse reflectance spectra acquired from a UV-VIS-NIR scanning spectrophotometer (Varian Cary 500) with an integrating sphere accessory. The X-ray photoelectron spectroscopy (XPS) characterization was carried out by using a Kratos AXIS ULTRADLD XPS system equipped with an Al Kα monochromated X-ray source and a 165-mm mean radius electron energy hemispherical analyzer. All XPS spectra were calibrated with C 1 sec. at 284.8 eV. The nitrogen adsorption desorption measurements were conducted on a Micromeritics ASAP 2020 Plus Physisorption apparatus. The as synthesized samples were degassed at 250° C. for 5 hours before the measurement. The BET surface area of the samples was measured by multipoint BET method using the adsorption data in a relative pressure (P/P0) range of 0.05-0.3. A desorption isotherm was used to determine the pore size distribution via the Barret-Joyner-Halender (BM) method.

Example 2.2

Morphology Characterization

Figure 6:
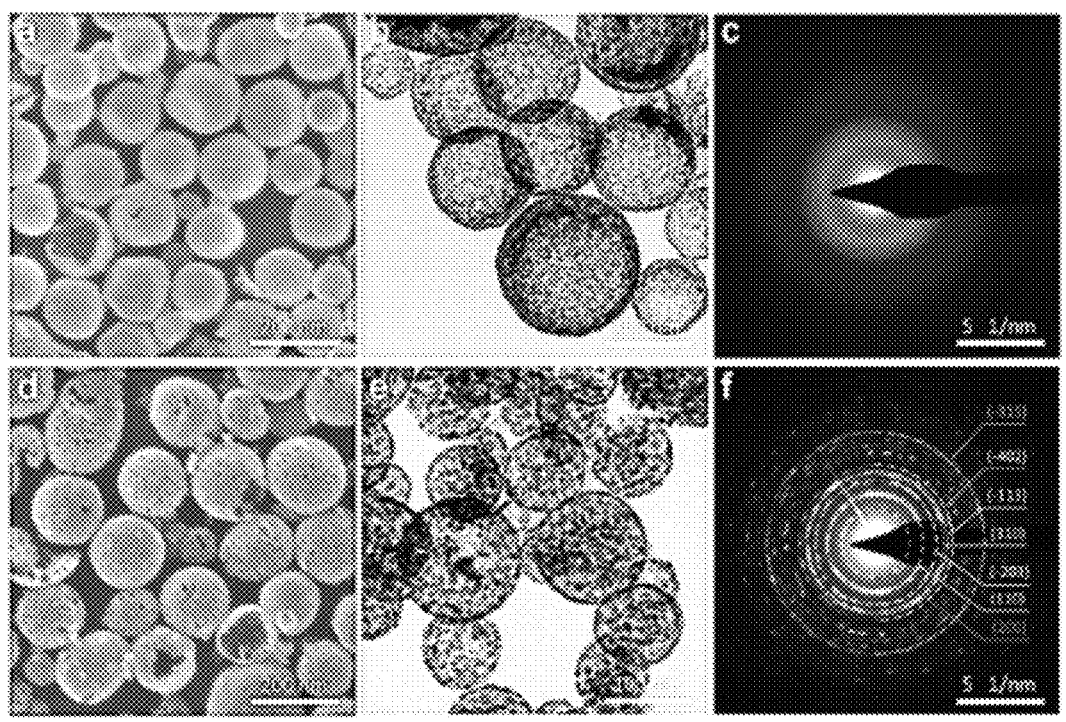
FIG. 6 is a series of pictures showing: (a & b) SEM and TEM micrographs of $Ta_2O_5$ hollow nanospheres; (C) SAED from area of (b); (d, e) SEM and TEM micrographs of the as prepared $Ta_3N_5$HNS annealed for 12 hours and (f) SAED from area of (e).
Figure 7:
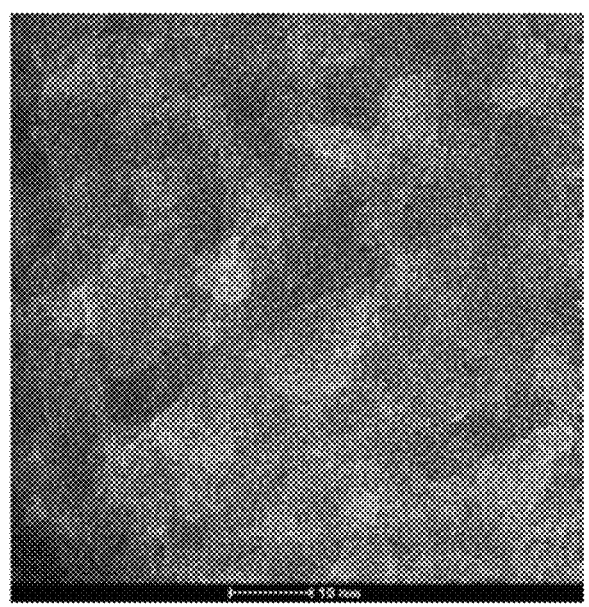
FIG. 7 depicts a High-Resolution Transmission Electron Microscope (TEM) (HRTEM) micrograph of the surface of a $Ta_2O_5$ hollow nanosphere, indicating the amorphous and/or weakly nanocrystalline state of the material.

The morphology of $Ta_2O_5$ hollow nanospheres (HNS) obtained after hydrothermal treatment at 200° C. for 12 h, TOHS, was investigated by SEM and TEM (FIGS. 6a and 6b). These mesoporous tantalum oxide HNS have an average diameter of ~115 nm and were used as precursor particles for making tantalum nitride HNS. Selected area electron diffraction (FIG. 6c) of these hydrothermally synthesized particles reveals diffuse rings, suggesting an amorphous or weakly nanocrystalline material. High-resolution TEM (FIG. 7) analyses confirms a disordered structure without discernible lattice fringes.

Figure 8:
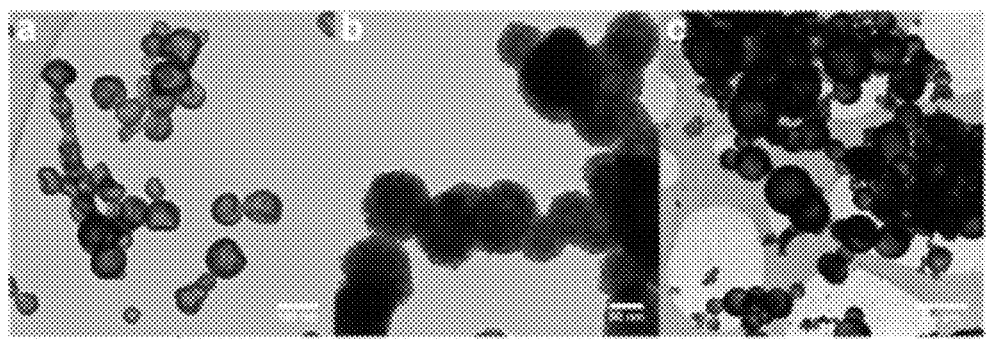
FIG. 8 is a collection of TEM micrographs of (a) bowl-like (collapsed) tantalum oxide particles without hydrothermal treatment; (b) aggregates formed upon water addition to $Ta(OEt)_5$/EtOH sols; (c) tantalum oxide particles with larger sizes formed when the volumetric ratio of ethanol to water is 1:20.

Interestingly, when examining the TOPC, bowl-like hollow shells could be formed without hydrothermal treatment (FIG. 8a). However, these shells were actually collapsed hollow nanospheres. This supports the assertion that in order to obtain hollow tantalum oxide nanospheres without solid templates, it is essential to control the reaction sequence. It was observed that the $Ta(OEt)_5$/EtOH mixture solution needs to be added into excessive amounts of water; otherwise, only amorphous aggregates were formed (FIG. 8b). While not wanting to be limited by theory it is thought this result can be explained by an oil (i.e., mixed $Ta(OEt)_5$/EtOH) in water emulsion formation mechanism, which could provide an interface for the formation of the ultrathin tantalum oxide shells. Indeed, when a highly reactive metal (e.g., pentavalent) with relatively short chain alkoxy groups reacts with water, the hydrolysis kinetics are fast and condensation can commence. In this case (metal alkoxide in solvent added into water), solid material is deposited within this interfacial region between the oil and water phase, yielding a hollow shell. Conversely, if water is added into a solution of the precursor, hydrolysis occurs before micelle formation, and thus no HNS can be formed.

It is also worth noting that HNS with larger sizes up to 800 nm can be produced by simply decreasing the ethanol to water solvent ratio to 1:20 (FIG. 8c), HSPC-5. While not wanting to be limited by theory, it is thought that that low ethanol content would favor the micelle formation as the immiscibility between the alkoxide and water can be decreased by ethanol addition. When these reactions are carried out at room temperature (i.e., not under hydrothermal conditions), the extent of mass transport of metal oxide/hydroxide species and condensation reactions are reduced, leading to a decrease in integrated networks of metal oxides, likely leading to reduced stiffness and subsequent collapse of these HNS. It is thought that utilizing hydrothermal conditions enables additional hydrolysis/polycondensation reactions to occur between precursors, forming stiffer metal oxide frameworks and leading to well-defined hollow nanospheres with stabilized structures. In addition, the high temperature and pressure of these reactions can induce Ostwald ripening that not only connects loosely aggregated amorphous particles to each other, but also leads to the formation of pores within the shell. As additional ripening occurs, it is thought that the walls of HNS can become thinner and a mesoporous tantalum oxide HNS can be formed.

Figure 9:
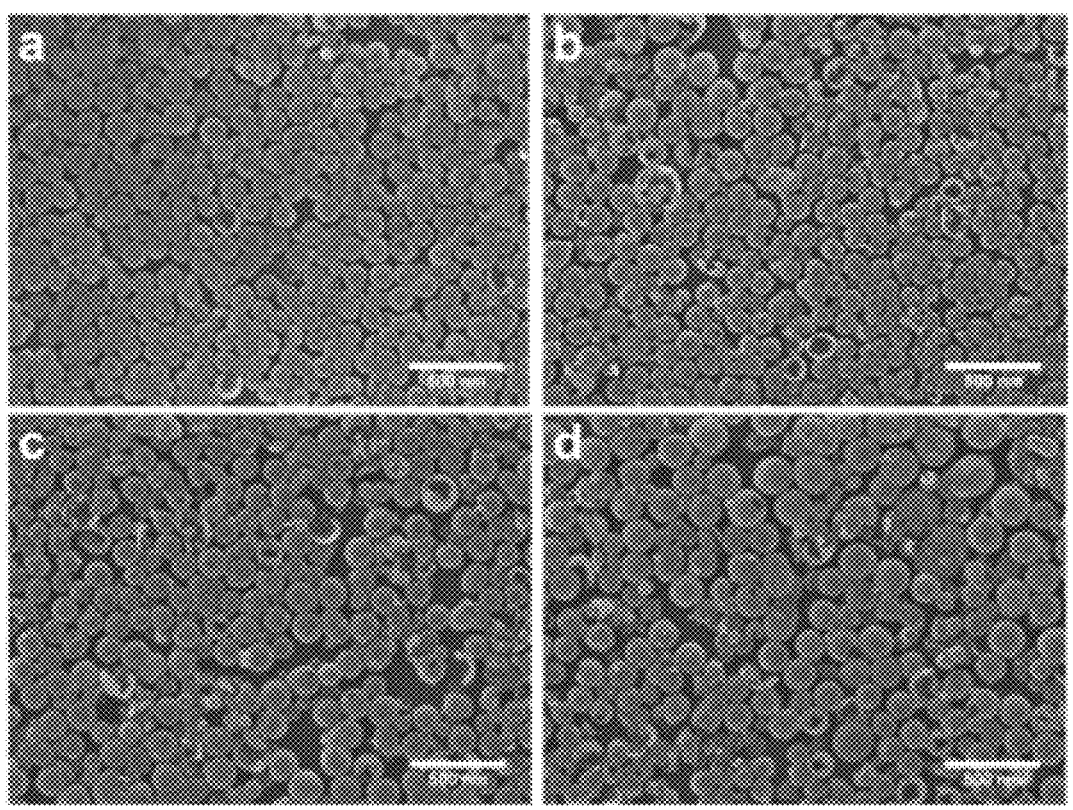
FIG. 9 is a collection of Scanning Electron Microscope (SEM) micrographs of (a) tantalum oxide HNS; (b, c, d) tantalum nitride HNS at 650° C. for 4 hours, 8 hours; and 12 hours, respectively. The average particle sizes of all samples are similar, ~113.35 nm +/−22.74 nm.

Representative SEM and TEM micrographs of $Ta_3N_5$ hollow nanospheres (FIGS. 6d and 6e) prepared from the direct nitridation of $Ta_2O_5$HNS at 650° C. for 12 h, HSPC-3, under ammonia flow demonstrate that the morphology of the initially synthesized spherical particles is retained without an obvious change in the particle size (FIG. 9). Furthermore, a selected area electron diffraction pattern (FIG. 6f) obtained from the area depicted in FIG. 6e presents multiple strong diffraction rings at d-spacings of 0.160 nm, 0.229 nm, 0.248 nm, 0.256 nm, 0.284 nm, 0.362 nm, and 0.511 nm, which correspond to the (–3 1 5), (–4 0 2), (1 1 3), (3 1 0), (–2 0 3), (1 1 0), and (2 0 0) crystal facets of monoclinic $Ta_3N_5$, respectively. This confirms that phase pure $Ta_3N_5$ can be obtained at significantly reduced nitridation temperatures (e.g., more than 150° C. lower) than former studies commonly required to complete the nitridation of $Ta_2O_5$ nanoparticles.

This reduced nitridation temperature is likely attributed to enhanced diffusion of reactive nitriding species within the hollow thin shell structure as well as the ability to transform highly disordered (i.e., amorphous) particles with small sizes.

Example 2.3

X-Ray Diffraction Characterization

Figure 10:
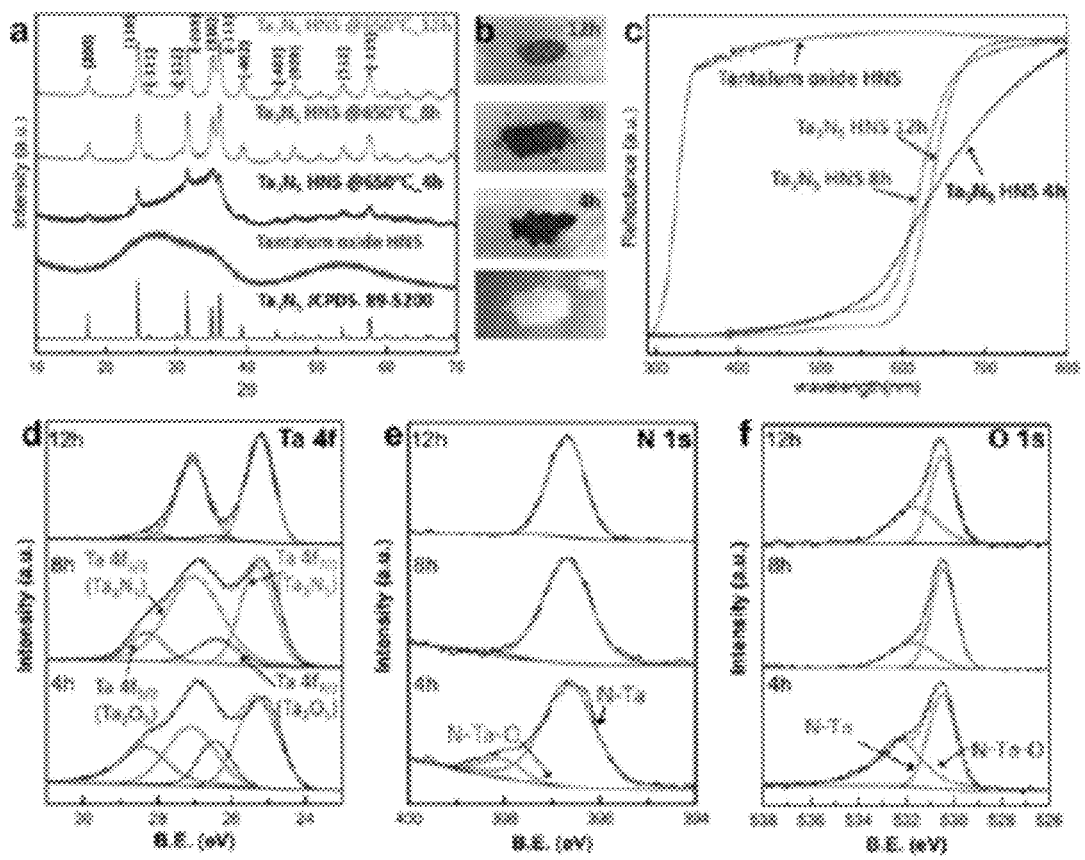
FIG. 10 is a collection of X-Ray Diffraction (XRD) and X-Ray Photoelectron Spectroscopy (XPS) plots and corresponding pictures for the different catalysts: (a) XRD patterns of the as-prepared $Ta_2O_5$HNS and $Ta_3N_5$HNS synthesized at 650° C. at different annealing times; (b) pictures, and the corresponding (c) UV-Vis diffuse reflectance spectra of these samples. High-resolution XPS spectra of (d) Ta 4f, (e) N 1s and (1) O 1s of $Ta_3N_5$HNS obtained under nitridation atmosphere for 4 hours, 8 hours, and 12 hours at 650° C. respectively.

X-ray diffraction (XRD) of powdered samples HSPC-1, HSPC-2, and HSPC-3, was performed in order to further confirm the phase change of the tantalum oxide starting materials under various nitridation times at 650° C., see FIG. 10a. Consistent with previous results, tantalum oxide HNS initially consisted of amorphous/weakly nanocrystal line domains, subsequently undergoing a phase transition to a crystalline nitride material after annealing for at least 4 hours under ammonia flow. All diffraction peaks for these samples, HSPC-1, HSPC-2, and HSPC-3, all nitrided at or longer than 4 hours are characteristic of monoclinic $Ta_3N_5$ (JCPDS Card No. 89-5200). Photographs of the as-annealed $Ta_3N_5$HNS products (see FIG. 10b) demonstrate a significant color change with elongated nitridation times, from white to brown and then eventually a bright red. This result matches well with the optical properties of the hollow nanospherical materials, which were characterized by measuring the UV-Vis diffuse reflectance spectra, as shown in FIG. 10c. The adsorption band-edge for tantalum oxide and $Ta_3N_5$FINS (12 hours), or HSPC-3, are at 310 nm and 600 nm, corresponding to the reported bandgap values of 4.0 eV and 2.1 eV, respectively. The conduction and valence bands of $Ta_3N_5$ are contributed to the Ta 5d and N 2p orbitals, respectively. The large red shift after nitridation is hence caused by the substitution of nitrogen atoms, whose 2p orbitals have higher potential energy than oxygen atoms, narrowing the bandgap greatly by shifting the valence band upward, also enabling the visible light-driven ability. Moreover, the band structure of $Ta_3N_5$HNS (8 hours), or HSPC-2, is calculated to be at approximately 2.2 eV, slightly higher than that of the HSPC-3, the sample annealed for 12 hours, which is in good agreement with the subtle color difference between these two products. Both 8-hour and 12-hour samples show a similar crystallinity (as observed in the full width at half maximum (FWHM) of peaks in the XRD patterns, FIG. 10A). Conversely, HNS heated at 650° C. for 4 hours (HSPC-1) shows a relatively larger bandgap (2.4 eV), indicating an incomplete conversion to the nitride.

X-Ray Photoelectron Spectroscopy (XPS) Characterization

Figure 11:
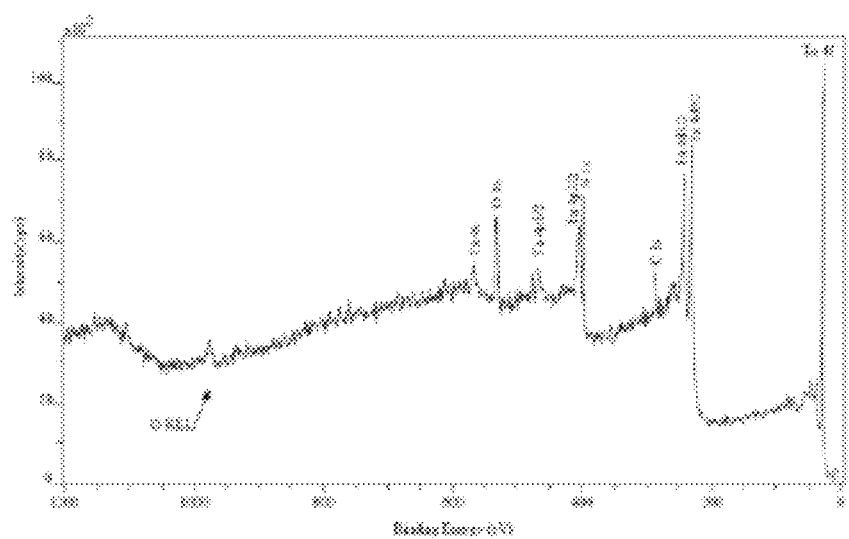
FIG. 11 is an XPS survey scan of $Ta_3N_5$HNS at 650° C. for 12 hours, highlighting the presence of tantalum, nitrogen, oxygen and carbon in specimen.
Figure 12:
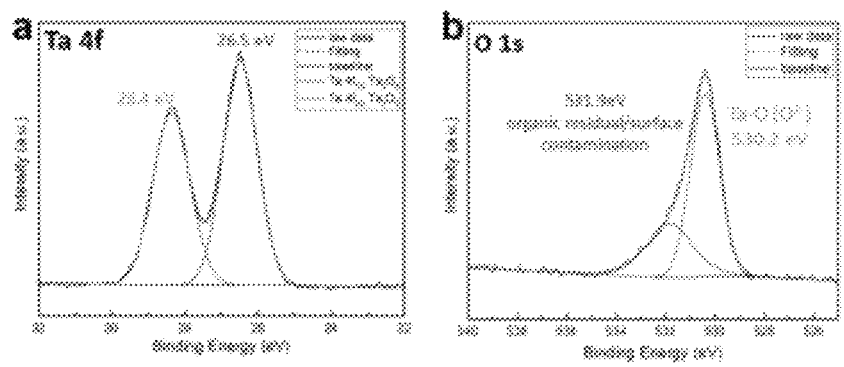
FIG. 12 are XPS spectra of (a) Ta 4f and (b) O 1s of the hydrothermally-assisted synthesized tantalum oxide HNS, indicating the Ta—O binding energies in the oxide HNS sample.

XPS was also carried out to further investigate the composition of the $Ta_3N_5$HNS annealed at 650° C. for different durations, i.e., 4 hours, 8 hours, and 12 hours, HSPC-1, HSPC-2, and HSPC-3 respectively. Only Ta, C, O and N elements were found in the survey spectrum (FIG. 11). Deconvoluted Ta 4f spectra (FIG. 10d) of the nitrided samples revealed four peaks. The binding energies for the Ta $4f_{7/2}$ and Ta $4f_{5/2}$ peaks at 25.3 and 27.1 eV represent $Ta^{5+}$ of $Ta_3N_5$. In addition, the Ta $4f_{7/2}$ ($Ta_2O_5$) [26.5 eV] and Ta $4f_{5/2}$ ($Ta_2O_5$) [28.4 eV] peak intensities decrease with longer nitridation times, indicating that oxygen content is reduced, but remains in the system even after 12 hours of nitridation at 650° C. This is further confirmed by the XPS analysis of the tantalum oxide HNS sample (FIG. 12). XPS analysis of N 1s spectra revealed $N^{3-}$ in $Ta_3N_5$ with a typical value of 396.8 eV. Notably, a small peak with higher binding energy exists in the 4-hour specimen (HSPC-1) and decreases with a longer nitridation duration, which could be ascribed to the N—Ta—O species (i.e., Ta atoms partially bonded to N and to O). This is likely as nitrogen has a lower electronegativity (3.04) than oxygen (3.44) and hence there is a nearest-neighbor effect to increase the binding energy. The O 1s is spectra of $Ta_3N_5$HNS samples show a main peak centered at 530.2 eV, which was associated with O—Ta bonding. The other O 1s is peaks present at ~532 eV could be related to residual organic ligands (e.g., alkoxy groups), —OH groups, or even carbonate contamination on the surface of the products.

High-Resolution TEM Characterization

Figure 13:
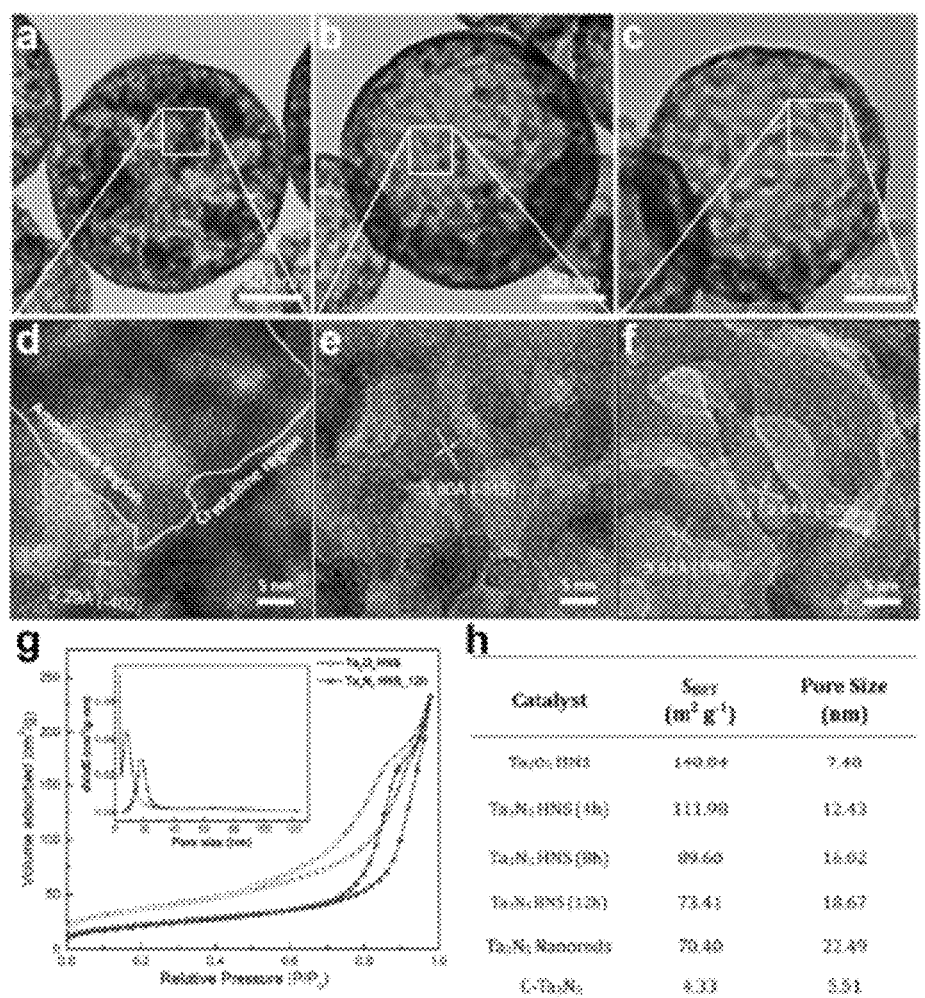
FIG. 13 is (a-c) TEM micrographs and (d-f) HRTEM micrographs of $Ta_3N_5$HNS annealed for 4 hours, 8 hours, and 12 hours; respectively; (g) nitrogen adsorption-desorption isotherms of amorphous $Ta_2O_5$ hollow nanospheres and crystalline $Ta_3N_5$HNS with the inset corresponding to the pore size distribution; (h) a table summarizing the BET surface area and average pore size of different $Ta_3N_5$ photocatalysts.

To further investigate crystalline grain growth, structural integrity and pore evolution of the hollow nanospheres during nitridation, high resolution TEM (HRTEM) analyses of HSPC-1, HSPC-2, and HSPC-3 was performed. Direct observations based on the TEM micrographs indicated that HSPC-1, or the $Ta_3N_5$HNS annealed at 650° C. for 4 h exhibited the smallest crystal domains (FIG. 13a) with grain sizes significantly increasing with longer nitridation times (FIG. 13b, 13c). This was corroborated with crystallite size calculations using the Scherrer equation, shown in Table 2. In the table, the full-width at half-maximum (FWHM) of the (110), (023) and (113) peaks were measured and applied to the Scherer formula in order to calculate the average crystallite size.

TABLE 2

The crystallite sizes of $Ta_3N_5$ HNS Samples Synthesized at 650° C. for 4 h, 8 h and 12 h.

| Photocatalyst | $Ta_3N_5$ HNS 650° C. 4 h | $Ta_3N_5$ HNS 650° C. 8 h | $Ta_3N_5$ HNS 650° C. 12 h |
|---|---|---|---|
| Crystallite Size (nm) | 7.84 | 11.91 | 12.64 |

It is also important to point out that the grain size increases only slightly when the annealing time was increased from 8 hours, HSPC-2, to 12 hours, HSPC-3, indicating the grain growth kinetics were significantly impeded by boundary interactions amongst different grains. Closer observation of these HNS using HRTEM revealed the evolution of grain growth of the $Ta_3N_5$ spheres with increased reaction time. Weakly crystalline grains within an amorphous matrix were observed in HSPC-1, the 4-hour sample (FIG. 13d), while highly crystalline grains that are interconnected were observed in $Ta_3N_5$HNS annealed at 8 hours, HSPC-2, and 12 hours, HSPC-3, see FIGS. 13e, 13f. In addition, a larger fraction of sintered particles, larger pores and more porosity were introduced to the hollow spherical particles with increased nitridation time. This can also be explained that during crystallization, mass transport can occur between smaller, high surface area particles or with larger particles to reduce overall free energy. This mass transfer also causes increasing strain within the FENS shell, together with the volume shrinkage resulting from the nitrogen and oxygen atom substitution, which increases the porosity and yields a mesoporous material.

Porosity Investigation

In order to investigate this change in porosity, nitrogen adsorption/desorption isotherms of as-synthesized $Ta_2O_5$HNS, TOHS, and $Ta_3N_5$ nitrided for 12 hours, HSPC-3, were investigated (FIG. 13d), The Brunauer-Emmett-Teller (BET) surface area was reduced from 140.84 m2 g-1 for TOHS precursor particles to 73.41 m2 g-1 for HSPC-3 likely due to grain growth during the nitridation treatment. Furthermore, the corresponding Barrett-Joyner-Halenda (BM) analysis reveals the existence of ~7.5 nm pores in the oxide HNS, while those in nitride HNS increased to a diameter of 18.67 nm. The table from FIG. 13e shows the summary BET surface area and pore size results for all other $Ta_3N_5$ photocatalyst specimens. Here, it is likely that the surface area of the $Ta_3N_5$HNS significantly decreased with nitridation times due to an increase in grain size, whereas the pore size increased, corroborating our HRTEM results. The synthetic $Ta_3N_5$ nanostructures possess significantly higher surface area (~20 times more) than the tantalum nitride obtained from commercial bulk $Ta_2O_5$ with the same nitridation technique, highlighting the advantages of the solution-based precursor particle method utilized here.

Example 3

Photocatalytic Tests

Photocatalytic activity of the products was studied by degradation of Methylene Blue (MB) dye in an aqueous solution under visible light irradiation using a 300W xenon lamp (Newport, QE-PV—SI) light source. In a typical procedure, 10 mg of the photocatalyst was added into 50 mL of an aqueous solution of MB (30 μM), which was ultra-sonicated for 5 minutes. The resulting uniform suspension was magnetically stirred (500 rpm) at room temperature (25° C.) in the dark for 1 h to reach the adsorption-desorption equilibrium at the surface of the catalyst before illumination. The photocatalytic activity was investigated by measuring the extent of MB dye concentration, determined by monitoring the intensity of the primary MB adsorption peak (at 664 nm) using an Agilent Cary 60 UVVIS spectrophotometer. To do this, 3 mL aliquots were collected at different intervals of time (every 10 min) and then centrifuged to remove the solid particles.

Figure 14:
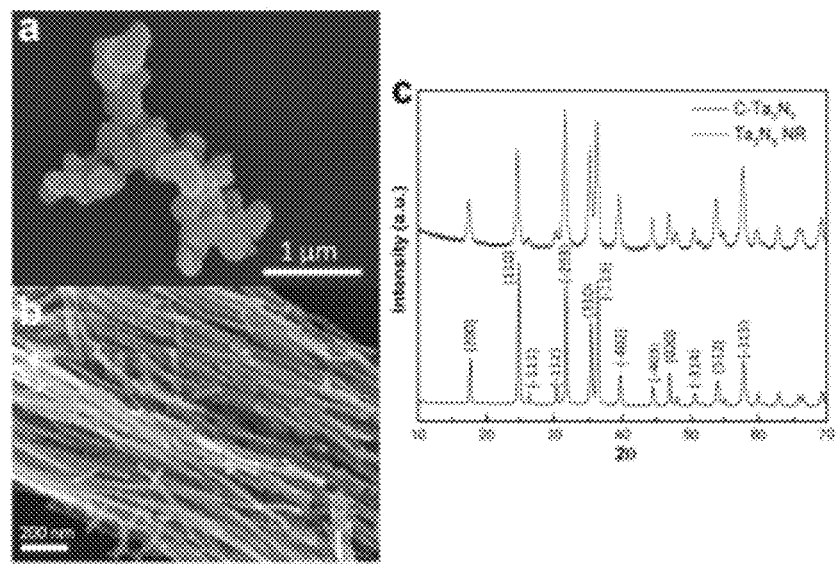
FIG. 14 are SEM micrographs of (a) commercial bulk $Ta_3N_5$; (b) $Ta_3N_5$ nanorods; and (c) the corresponding XRD patterns of commercial tantalum nitride (C—$Ta_3N_5$) and $Ta_3N_5$ nanorods synthesized at 800° C.
Figure 15:
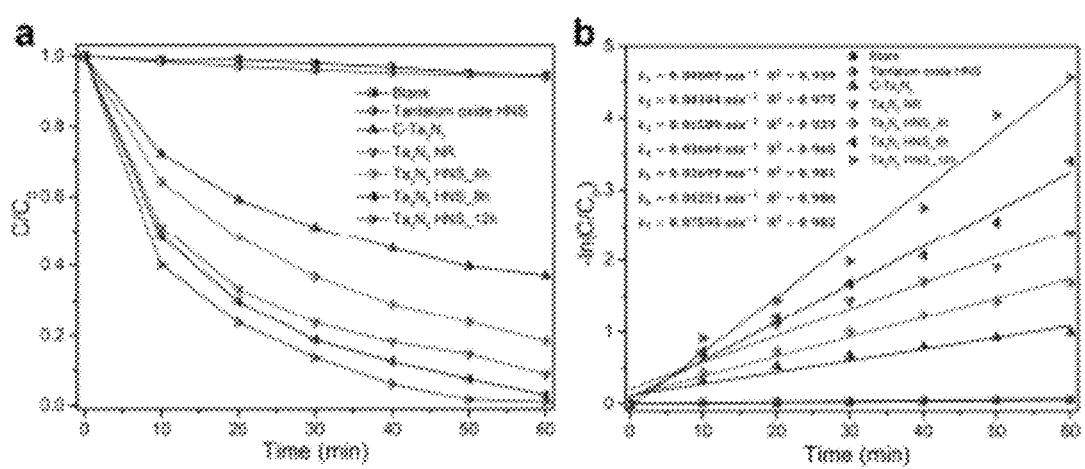
FIG. 15 shows: (a) change in methyl blue (MB) concentration versus visible light irradiation time in the presence of different photocatalysts; (b) plot of —In(C/CO) vs. time (C0 and C are the concentration before and after irradiation). k1 to k7 show the apparent reaction rate constants of experiment with different photocatalytic samples: k1=blank test, k2=tantalum oxide HSN, k3=commercial bulk $Ta_3N_5$, k4=$Ta_3N_5$ nanorods, k5=$Ta_3N_5$HNS (4 hour), k6=$Ta_3N_5$HNS (8 hour), k7=$Ta_3N_5$HNS (12 hours). R2 is the coefficient of determination.

The photocatalytic performance of the nanostructures was explored by investigating the degradation of Methylene blue (MB) solutions under visible light irradiation. For the sake of comparison, $Ta_3N_5$ nanorods and bulk $Ta_3N_5$ particles (FIG. 14) made from commercial tantalum oxide were tested in parallel with the as-prepared $Ta_3N_5$HNS synthesized at different nitridation times (i.e., 4 hours, 8 hours and 12 hours). As illustrated in FIG. 15a, the negative control ("blank test", no photocatalyst) showed a negligible amount of MB being degraded. After 60 min of exposure to light, almost all of the dye was removed using phase pure $Ta_3N_5$HNS 8 hours, HSPC-2, and 12 hours, HSPC-3. However, only 63% and 90% of the initial dye was degraded by C—$Ta_3N_5$, CPC-1, and $Ta_3N_5$ nanorods, NRPC-1, respectively. There is negligible photodegradation of MB when tantalum oxide HNS, TOHS, were examined, indicating that the oxide based hollow oxide spheres could not be activated using visible-light. The MB degradation data, shown in FIG.

15h, was subsequently analyzed with a pseudo-first-order model, $-\ln(C/C0)=kt$, where t is time and k is the reaction rate constant. Clearly, the $Ta_3N_5HNS$ specimen annealed for 12 hours, HSPC-3, shows the highest reaction rate, which is roughly 2 and 5 times better than that of $Ta_3N_5$ nanorods, or NRPC-1, and C—$Ta_3N_5$, or CPC-1, respectively. Thus, the relative photocatalytic performance of the nitride photocatalysts follow the order: HNS 12 hours>HNS 8 hours>nanorods>1-INS 4 hours>C—$Ta_3N_5$. To improve the performance of photocatalysts, it is vital to understand the key factors that control their photocatalytic efficiency. Crystallinity and crystallite size are necessary to be considered as higher crystallinity can reduce the number of defects, while a smaller crystallite size can decrease the migration distance for excitons to surface reaction sites. Furthermore, a larger surface area to increase the number of active surface sites as well as the surface charge carrier transfer rate, and a suitable band engineering to better utilize the energy from incident light are also generally desired in a photocatalytic system.

Based on these photodegradation results, it can be reasonably inferred that the overall hollow nanosphere structure shows superior photocatalytic activity versus bulk $Ta_3N_5$ and rod-like $Ta_3N_5$. Besides the fact that the FINS have a significantly larger surface area compared to the other solid structures, their hollow nature increases the light utilization efficiency because of the potential for multiple light interactions within their structures. In addition, the formation of a mesoporous structure can further enhance the physicochemical properties while the pores can enable a more efficient transport for small MB molecules to the active sites on the photocatalytic surfaces of the particles.

Comparatively, the $Ta_3N_5HNS$ sample annealed for 4 hours, HSPC-1, shows a significantly lower photodegradation efficiency than that of HNS with longer nitridation times. This specimen, which has a much larger surface area and smaller crystallite size, is likely less active than the 8 hour, HSPC-2, and 12 hour, HSPC-3, samples possibly due to two main reasons. Besides the slightly larger bandgap, there is a large amount of residual oxygen impurities retained in the lattice. The presence of these oxygen "defects" might be the major reason contributing to the suppressed photocatalytic activity because they can operate as trapping and recombination centers between photogenerated charge carriers, shortening the exciton lifetime. In addition, there are residual amorphous regions around the crystalline domain boundaries of the $Ta_3N_5$ nanocrystals which might increase the resistance for transport of the photogenerated electron and hole pairs. It is also worth noting that despite the similar grain size, crystallinity, bandgap and even a larger surface area, the $Ta_3N_5HNS$ 8 hour, HSPC-2, contains more oxygen (FIG. 10d) and exhibits a slightly inferior photodegradation performance over $Ta_3N_5HNS$ 12 hour, HSPC-3. This evidence suggests the role of oxygen as an impurity which reduces photocatalytic efficiency.

It was found that $Ta_3N_5$ has a narrow bandgap (2.1 eV) which makes it a visible light driven photocatalyst, enabling a more efficient solar irradiation utilization. The $Ta_3N_5$ hollow nano-spheres have a high surface area as well as the unique hollow sphere structure, which it thought to make their photocatalytic activity better. The synthesis of $Ta_3N_5HNS$ is very facile, no template is required. A standard thermal nitridation is used, but compared with other $Ta_3N_5$ synthesis systems, our system requires a much lower annealing temperature (less than 600° C.), which makes it less energy consuming and scalable. The method can be used to make different shapes of catalysts, shown in FIGS. 16a-d.

Figure 16:
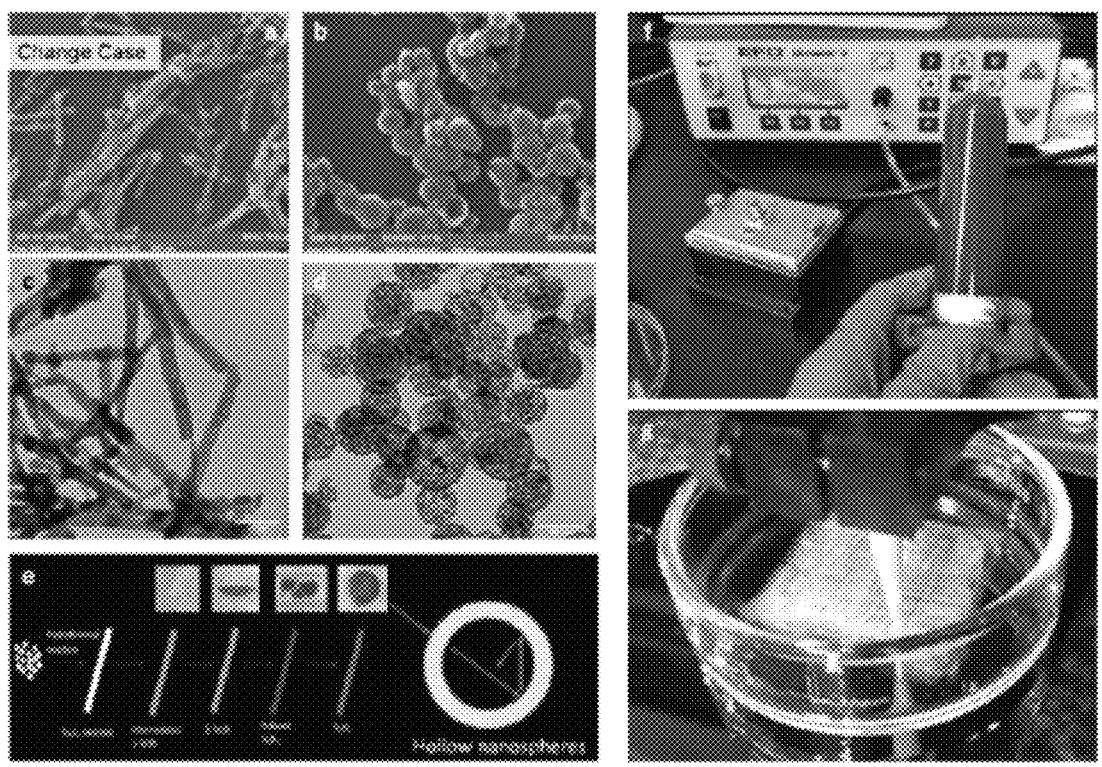
FIG. 16 is a collage that provides a synopsis of the results of the embodiments, including the ability make catalysts of different morphologies (a & c) 1-D $Ta_3N_5$ nanorods and (b & d) $Ta_3N_5$ hollow nanospheres, as well as the ability to adjust bandgap and color as shown in (e); and (f & g) a possible application of the catalyst on a fiber support.

The stoichiometry and elemental composition of the catalysts can also be tailored by adjusting the nitriding duration and/or temperature, see FIG. 16e, to change the bandgap and color. Possible embodiments of catalysts can be applied to a structural support, see FIGS. 16f-g, for possible catalyst applications, including but not limited to water purification.

Unless otherwise indicated, all numbers expressing quantities of ingredients, properties such as molecular weight, reaction conditions, and so forth used in the specification and claims are to be understood as being modified in all instances by the term "about." As used herein, the term "about" means that the item, parameter or term so qualified encompasses a range of plus or minus ten percent above and below the value of the stated item, parameter or term. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed considering the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

While a number of advantages of embodiments described herein are listed above, the list is not exhaustive. Other advantages of embodiments described above will be apparent to one of ordinary skill in the art, having read the present disclosure. Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used. The scope of the invention should be determined with reference to the appended claims, along with the full scope of equivalents to which such claims are entitled.

Additional Notes

In the event of inconsistent usages between this document and any documents so incorporated by reference, the usage in this document controls. In this document, the terms "a" or "an" are used, as is common in patent documents, to include one or more than one, independent of any other instances or usages of "at least one" or "one or more," In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

The term "substantially simultaneously" or "substantially immediately" or "substantially instantaneously" refers to events occurring at approximately the same time. It is contemplated by the inventor that response times can be limited by mechanical, electrical, or chemical processes and systems. Substantially simultaneously, substantially immediately, or substantially instantaneously can include time periods 1 minute or less, 45 seconds or less, 30 seconds or less, 20 seconds or less, 15 seconds or less, 10 seconds or less, 5 seconds or less, 3 seconds or less, 2 seconds or less, 1 second or less, 0.5 seconds or less, or 0.1 seconds or less.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about" as used herein can allow for a degree of variability in a value or range, for example, within 10%, within 5%, or within 1% of a stated value or of a stated limit of a range.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 CFR. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method of making a tuned, light-activated photocatalyst without the use of templates comprising: (1) mixing a metal precursor, ethanol, and a solvent to form self-assembled shapes at a temperature between the freezing point of the solvent and the boiling point of the solvent, (2) strengthening the shapes at a temperature of about 35° C. to about 300° C. for about 30 minutes to about 96 hours, and then (3) annealing the shapes at a temperature of between about 450° C. to about 750° C. for between about 4 hours to about 16 hours in a gaseous atmosphere, where the step of mixing a solvent comprises mixing in water, where the volume ratio of ethanol to water is from about 1:2 to about 1:40.

2. The method of claim 1, wherein the step of mixing a metal precursor comprises mixing a metal salt, a metal alkoxide, a metal halide, or a combination thereof.

3. The method of claim 2, wherein the step of mixing a metal precursor comprises mixing a metal alkoxide.

4. The method of claim 3, wherein the step of mixing a metal alkoxide comprises mixing tantalum alkoxide.

5. The method of claim 1, wherein the volume ratio of ethanol to water is 2:5.

6. The method of claim 1, wherein the volume ratio of ethanol to water is 1:20.

7. The method of claim 1, wherein the step of strengthening the shapes is done at a temperature of 200° C. from 12 hours to 72 hours.

8. The method of claim 7, wherein the step of strengthening the shapes is done at a temperature of 200° C. from 12 hours to 48 hours.

9. The method of claim 1, wherein the step of annealing the shapes is done at 625° C. for 8 hours.

10. The method of claim 9, wherein the step of annealing the shapes is done in a nitriding atmosphere.

11. The method of claim 10, wherein the step of annealing the shapes is done in an ammonia atmosphere.

* * * * *